(12) United States Patent
Sasaki et al.

(10) Patent No.: US 9,086,782 B2
(45) Date of Patent: Jul. 21, 2015

(54) DISPLAY-CONTROLLING DEVICE, DISPLAY DEVICE, DISPLAY-CONTROLLING METHOD, AND COMPUTER READABLE MEDIUM

(75) Inventors: Shigehiko Sasaki, Ebina (JP); Kyotaro Tomoda, Ebina (JP); Akira Ichiboshi, Ebina (JP); Masahiro Sato, Ebina (JP); Tsutomu Ishii, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 676 days.

(21) Appl. No.: 12/868,367

(22) Filed: Aug. 25, 2010

(65) Prior Publication Data
US 2011/0173567 A1 Jul. 14, 2011

(30) Foreign Application Priority Data

Jan. 13, 2010 (JP) ................................. 2010-004940

(51) Int. Cl.
*G06F 3/048* (2013.01)
*G06F 3/0482* (2013.01)

(52) U.S. Cl.
CPC .................................... *G06F 3/0482* (2013.01)

(58) Field of Classification Search
CPC ................................................. G06F 3/04892
USPC ......... 715/854, 708, 712, 772, 802, 819, 820, 715/823, 829, 835
See application file for complete search history.

(56) References Cited

U.S. PATENT DOCUMENTS

| | | | | |
|---|---|---|---|---|
| 4,288,537 A | * | 9/1981 | Knetzger ...................... | 434/169 |
| 4,669,984 A | * | 6/1987 | Jones et al. .................... | 434/85 |
| 4,949,270 A | * | 8/1990 | Shima et al. .................. | 700/184 |
| 5,065,347 A | * | 11/1991 | Pajak et al. .................... | 715/835 |
| 5,185,696 A | * | 2/1993 | Yoshino et al. .............. | 705/36 R |
| 5,261,042 A | * | 11/1993 | Brandt .......................... | 715/841 |
| 5,404,351 A | * | 4/1995 | Inoue ............................ | 370/276 |
| 5,519,859 A | * | 5/1996 | Grace ............................ | 707/690 |

(Continued)

FOREIGN PATENT DOCUMENTS

| | | | | |
|---|---|---|---|---|
| EP | 833264 A1 | * | 4/1998 | ............. G06F 17/50 |
| EP | 1577746 A2 | * | 9/2005 | ............. G06F 3/033 |

(Continued)

OTHER PUBLICATIONS

Bing search q=icon%20direction%20movement&qs=n&f Apr. 5, 2015.*

(Continued)

*Primary Examiner* — Boris Pesin
*Assistant Examiner* — John Heffington
(74) *Attorney, Agent, or Firm* — Oliff PLC

(57) ABSTRACT

A display-controlling device includes: a display-controlling unit that controls a display unit to display an image indicating an item selected upon receipt of an instruction at a receiving unit, wherein if a first image indicating a first selected item is displayed at a first position, and an item instructed to be selected changes from the first selected item to a second selected item, the display-controlling unit causes there to be displayed, without erasure of the first image, a second image indicating the second selected item at a second position, which position is reached from the first position by movement in the first direction by an amount based on a position of the second selected item as viewed from the first selected item, with simultaneous movement in a second direction other than the first direction by a predetermined amount.

10 Claims, 6 Drawing Sheets

(56) References Cited

U.S. PATENT DOCUMENTS

| | | | |
|---|---|---|---|
| 5,546,517 A * | 8/1996 | Marks et al. | 715/206 |
| 5,556,339 A * | 9/1996 | Cohen | 463/1 |
| 5,619,619 A * | 4/1997 | Shinohara et al. | 706/28 |
| 5,778,382 A * | 7/1998 | Hatori | |
| 5,821,926 A * | 10/1998 | Arita | 715/744 |
| 5,831,616 A * | 11/1998 | Lee | 715/861 |
| 5,841,438 A * | 11/1998 | Cave | 715/723 |
| 5,859,641 A * | 1/1999 | Cave | 715/835 |
| 5,862,056 A * | 1/1999 | Iwata et al. | 700/184 |
| 5,892,507 A * | 4/1999 | Moorby et al. | 715/205 |
| 5,940,293 A * | 8/1999 | Schwenke et al. | 700/61 |
| 6,061,062 A * | 5/2000 | Venolia | 715/856 |
| 6,076,020 A * | 6/2000 | Schwenke et al. | 700/18 |
| 6,084,585 A * | 7/2000 | Kraft et al. | 715/733 |
| 6,101,415 A * | 8/2000 | Er et al. | 607/27 |
| 6,144,378 A * | 11/2000 | Lee | 715/767 |
| 6,208,770 B1 * | 3/2001 | Gilman et al. | 382/305 |
| 6,304,273 B1 * | 10/2001 | Bonnet | 345/440 |
| 6,329,991 B1 | 12/2001 | Fukuda et al. | |
| 6,362,842 B1 * | 3/2002 | Tahara et al. | 715/856 |
| 6,415,164 B1 * | 7/2002 | Blanchard et al. | 455/566 |
| 6,448,987 B1 * | 9/2002 | Easty et al. | 715/834 |
| 6,453,078 B2 * | 9/2002 | Bubie et al. | 382/305 |
| 6,493,467 B1 * | 12/2002 | Okuda et al. | 382/260 |
| 6,501,469 B1 * | 12/2002 | MacPhail | 345/419 |
| 6,507,343 B1 * | 1/2003 | MacPhail | 345/440 |
| 6,556,225 B1 * | 4/2003 | MacPhail | 715/848 |
| 6,754,660 B1 * | 6/2004 | MacPhail | |
| 6,907,451 B1 * | 6/2005 | Mukundan et al. | 709/204 |
| 7,134,092 B2 * | 11/2006 | Fung et al. | 715/779 |
| 7,149,710 B1 * | 12/2006 | Edmark | 705/26.8 |
| 7,178,111 B2 * | 2/2007 | Glein et al. | 715/848 |
| 7,228,311 B2 * | 6/2007 | Ito | |
| 7,246,329 B1 * | 7/2007 | Miura et al. | 715/810 |
| 7,283,845 B2 * | 10/2007 | De Bast | 455/566 |
| 7,287,032 B2 * | 10/2007 | Attili et al. | |
| 7,299,418 B2 * | 11/2007 | Dieberger | 715/732 |
| 7,319,764 B1 * | 1/2008 | Reid et al. | 381/104 |
| 7,346,543 B1 * | 3/2008 | Edmark | 705/27.2 |
| 7,506,256 B2 * | 3/2009 | Baker et al. | 715/708 |
| 7,509,238 B1 * | 3/2009 | Dumler et al. | 702/188 |
| 7,512,152 B1 * | 3/2009 | Dassow et al. | 370/468 |
| 7,707,055 B2 * | 4/2010 | Behmoiras et al. | 705/7.38 |
| 7,725,828 B1 * | 5/2010 | Johnson | 715/726 |
| 7,730,425 B2 * | 6/2010 | de los Reyes et al. | 715/835 |
| 7,797,711 B2 * | 9/2010 | Iwamura | 725/37 |
| 7,818,032 B2 * | 10/2010 | Irimajiri | 455/566 |
| 7,844,987 B2 * | 11/2010 | Kelts | 725/44 |
| 7,912,689 B1 * | 3/2011 | Helson | 703/12 |
| 7,962,859 B2 * | 6/2011 | Attili et al. | 715/853 |
| 8,024,671 B2 * | 9/2011 | Lee et al. | 715/848 |
| 8,078,498 B2 * | 12/2011 | Edmark | 705/26.1 |
| 8,122,375 B2 * | 2/2012 | Ito | 715/811 |
| 8,136,045 B2 * | 3/2012 | Miura et al. | 715/764 |
| 8,151,185 B2 * | 4/2012 | Audet | 715/237 |
| 8,218,090 B2 * | 7/2012 | Yee et al. | 348/705 |
| 8,228,435 B2 * | 7/2012 | Yi | 348/570 |
| 8,402,359 B1 * | 3/2013 | Pogodin et al. | 715/206 |
| 8,451,232 B2 * | 5/2013 | Tolmasky et al. | 345/173 |
| 8,635,559 B2 * | 1/2014 | Lee et al. | 715/859 |
| 8,689,132 B2 * | 4/2014 | Lamiraux et al. | 715/784 |
| 8,863,016 B2 * | 10/2014 | Victor | 715/769 |
| 8,972,879 B2 * | 3/2015 | Migos et al. | 715/766 |
| 8,982,105 B2 * | 3/2015 | Frisbee | 345/184 |
| 2001/0006560 A1 * | 7/2001 | Gilman et al. | 382/162 |
| 2001/0014184 A1 * | 8/2001 | Bubie et al. | 382/293 |
| 2001/0024212 A1 * | 9/2001 | Ohnishi | 345/769 |
| 2001/0056323 A1 * | 12/2001 | Masters et al. | 701/115 |
| 2002/0013654 A1 * | 1/2002 | Masters et al. | 701/110 |
| 2002/0103683 A1 * | 8/2002 | Tsuda et al. | 705/7 |
| 2004/0023191 A1 * | 2/2004 | Brown et al. | 434/156 |
| 2004/0024303 A1 * | 2/2004 | Banks et al. | 600/407 |
| 2004/0036720 A1 * | 2/2004 | Dworsky | 345/764 |
| 2004/0073404 A1 * | 4/2004 | Brooks et al. | 702/183 |
| 2004/0122551 A1 * | 6/2004 | Ogawa et al. | 700/214 |
| 2004/0143542 A1 * | 7/2004 | Magill et al. | 705/37 |
| 2004/0150664 A1 * | 8/2004 | Baudisch | 345/740 |
| 2004/0215660 A1 * | 10/2004 | Ikeda | 707/104.1 |
| 2005/0076308 A1 * | 4/2005 | Mansell et al. | 715/811 |
| 2005/0080769 A1 * | 4/2005 | Gemmell et al. | 707/3 |
| 2005/0085284 A1 * | 4/2005 | Onoda et al. | 463/7 |
| 2005/0163304 A1 * | 7/2005 | Judkins et al. | 379/265.02 |
| 2005/0171940 A1 * | 8/2005 | Fogg et al. | 707/3 |
| 2005/0210410 A1 * | 9/2005 | Ohwa et al. | 715/821 |
| 2005/0235209 A1 * | 10/2005 | Morita et al. | 715/716 |
| 2005/0273299 A1 * | 12/2005 | Toyosawa et al. | 703/7 |
| 2006/0036613 A1 * | 2/2006 | Attili et al. | 707/100 |
| 2006/0064651 A1 * | 3/2006 | Ito | 715/853 |
| 2006/0074613 A1 * | 4/2006 | Oyama | 703/2 |
| 2006/0077246 A1 * | 4/2006 | Kawakami et al. | 347/104 |
| 2006/0136833 A1 * | 6/2006 | Dettinger et al. | 715/769 |
| 2007/0027855 A1 * | 2/2007 | Kagawa | 707/3 |
| 2007/0061748 A1 * | 3/2007 | Hirose | 715/764 |
| 2007/0067211 A1 * | 3/2007 | Kaplan et al. | 705/10 |
| 2007/0097074 A1 * | 5/2007 | Irimajiri | 345/157 |
| 2007/0103444 A1 * | 5/2007 | Byun et al. | 345/169 |
| 2007/0106950 A1 * | 5/2007 | Hutchinson et al. | 715/761 |
| 2007/0113202 A1 * | 5/2007 | Byun et al. | 715/810 |
| 2007/0139443 A1 * | 6/2007 | Marks et al. | 345/629 |
| 2007/0155373 A1 * | 7/2007 | Kim | 455/418 |
| 2007/0160345 A1 * | 7/2007 | Sakai et al. | 386/95 |
| 2007/0192749 A1 * | 8/2007 | Baudisch | 715/863 |
| 2007/0198459 A1 * | 8/2007 | Boone et al. | 707/1 |
| 2007/0220052 A1 * | 9/2007 | Kudo et al. | 707/104.1 |
| 2007/0250490 A1 * | 10/2007 | Okawa | 707/3 |
| 2007/0253009 A1 * | 11/2007 | Horn et al. | 358/1.9 |
| 2007/0266411 A1 * | 11/2007 | Yamamoto et al. | 725/88 |
| 2008/0016473 A1 * | 1/2008 | Attili et al. | 715/853 |
| 2008/0027881 A1 * | 1/2008 | Bisse | 705/36 R |
| 2008/0077874 A1 * | 3/2008 | Garbow et al. | 715/764 |
| 2008/0079997 A1 * | 4/2008 | Kawano | 358/1.15 |
| 2008/0080837 A1 * | 4/2008 | Mei et al. | 386/95 |
| 2008/0117232 A1 * | 5/2008 | Edmark | 345/630 |
| 2008/0141172 A1 * | 6/2008 | Yamamoto et al. | 715/835 |
| 2008/0172612 A1 * | 7/2008 | Allen et al. | 715/708 |
| 2008/0174597 A1 * | 7/2008 | Takagi | 345/418 |
| 2008/0195973 A1 * | 8/2008 | Shimkin | 715/817 |
| 2008/0235727 A1 * | 9/2008 | Seong et al. | 725/39 |
| 2008/0240560 A1 * | 10/2008 | Hibino et al. | 382/168 |
| 2008/0307351 A1 * | 12/2008 | Louch et al. | 715/782 |
| 2009/0006481 A1 * | 1/2009 | Hui et al. | 707/104.1 |
| 2009/0006959 A1 * | 1/2009 | Kalenius et al. | 715/710 |
| 2009/0044133 A1 * | 2/2009 | Goto et al. | 715/754 |
| 2009/0058821 A1 * | 3/2009 | Chaudhri et al. | 345/173 |
| 2009/0073172 A1 * | 3/2009 | Guo et al. | 345/440 |
| 2009/0073174 A1 * | 3/2009 | Berg et al. | 345/442 |
| 2009/0076939 A1 * | 3/2009 | Berg et al. | 705/37 |
| 2009/0076974 A1 * | 3/2009 | Berg et al. | 705/36 R |
| 2009/0077164 A1 * | 3/2009 | Phillips et al. | 709/203 |
| 2009/0077165 A1 * | 3/2009 | Rhodes et al. | 709/203 |
| 2009/0077216 A1 * | 3/2009 | Rhodes et al. | 709/223 |
| 2009/0125842 A1 * | 5/2009 | Nakayama | 715/835 |
| 2009/0158214 A1 * | 6/2009 | Arnold et al. | 715/830 |
| 2009/0164944 A1 * | 6/2009 | Webster et al. | 715/838 |
| 2009/0222766 A1 * | 9/2009 | Chae et al. | 715/835 |
| 2009/0265647 A1 * | 10/2009 | Martin et al. | 715/764 |
| 2009/0289903 A1 * | 11/2009 | Chen et al. | 345/173 |
| 2010/0017732 A1 * | 1/2010 | Matsushima et al. | 715/765 |
| 2010/0050116 A1 * | 2/2010 | Blick | 715/808 |
| 2010/0060597 A1 * | 3/2010 | Choi et al. | 345/173 |
| 2010/0070931 A1 * | 3/2010 | Nichols | 715/863 |
| 2010/0082699 A1 * | 4/2010 | Miyasa et al. | 707/802 |
| 2010/0104145 A1 * | 4/2010 | Momosaki | 382/118 |
| 2010/0145231 A1 * | 6/2010 | Takahashi et al. | 600/587 |
| 2010/0146339 A1 * | 6/2010 | Hansson et al. | 714/37 |
| 2010/0146422 A1 * | 6/2010 | Seong et al. | 715/765 |
| 2010/0146450 A1 * | 6/2010 | Harada | 715/838 |
| 2010/0157157 A1 * | 6/2010 | Yi | 348/570 |
| 2010/0161574 A1 * | 6/2010 | Davidson et al. | 707/705 |
| 2010/0192099 A1 * | 7/2010 | Takagi | 715/828 |
| 2010/0207869 A1 * | 8/2010 | Cazaux et al. | 345/156 |
| 2010/0238191 A1 * | 9/2010 | Lee et al. | 345/589 |
| 2010/0262912 A1 * | 10/2010 | Cha | 715/719 |
| 2010/0275151 A1 * | 10/2010 | Arakane | 715/784 |

(56) References Cited

U.S. PATENT DOCUMENTS

| | | | |
|---|---|---|---|
| 2010/0299168 A1* | 11/2010 | Alonzo et al. | 705/7 |
| 2010/0309196 A1* | 12/2010 | Castleman | 345/418 |
| 2010/0310193 A1* | 12/2010 | Castleman | 382/296 |
| 2010/0313166 A1* | 12/2010 | Nakayama et al. | 715/810 |
| 2010/0333022 A1* | 12/2010 | Inoue et al. | 715/811 |
| 2011/0012931 A1* | 1/2011 | Abe | 345/671 |
| 2011/0018818 A1* | 1/2011 | Iwano | 345/173 |
| 2011/0055760 A1* | 3/2011 | Drayton et al. | 715/834 |
| 2011/0063524 A1* | 3/2011 | Yee et al. | 348/739 |
| 2011/0066941 A1* | 3/2011 | Chipchase et al. | 715/716 |
| 2011/0069643 A1* | 3/2011 | Yoakum et al. | 370/261 |
| 2011/0179385 A1* | 7/2011 | Li et al. | 715/810 |
| 2011/0279350 A1* | 11/2011 | Hutchinson et al. | 345/1.1 |
| 2012/0005045 A1* | 1/2012 | Baker | 705/27.2 |
| 2012/0075339 A1* | 3/2012 | Edmark | 345/629 |
| 2012/0106923 A1* | 5/2012 | Wada | 386/230 |
| 2012/0206652 A1* | 8/2012 | Yi | 348/570 |
| 2012/0229376 A1* | 9/2012 | Matsumoto et al. | 345/156 |

FOREIGN PATENT DOCUMENTS

| | | | |
|---|---|---|---|
| JP | A-05-011970 | 1/1993 | |
| JP | A-05-073002 | 3/1993 | |
| JP | A-05-298057 | 11/1993 | |
| JP | A-06-051909 | 2/1994 | |
| JP | A-07-160428 | 6/1995 | |
| JP | A-07-219499 | 8/1995 | |
| JP | A-08-286808 | 11/1996 | |
| JP | A-10-091354 | 4/1998 | |
| JP | A-2001-249752 | 9/2001 | |
| JP | A-2005-052363 | 3/2005 | |
| WO | WO 2007069835 A1 * | 6/2007 | G06F 3/041 |
| WO | WO 2007148040 A1 * | 12/2007 | G06F 3/048 |

OTHER PUBLICATIONS

Bing search q=icon+array+direction+movement&src= Apr. 5, 2015.*

* cited by examiner

DISPLAY-CONTROLLING DEVICE, DISPLAY DEVICE, DISPLAY-CONTROLLING METHOD, AND COMPUTER READABLE MEDIUM

CROSS-REFERENCE TO RELATED APPLICATIONS

This application is based on and claims priority under 35 USC 119 from Japanese Patent Application No. 2010-004940 filed on Jan. 13, 2010.

BACKGROUND

1. Technical Field

The present invention relates to a display-controlling device, a display device, a display-controlling method, and a computer readable medium.

2. Related Art

A cursor (or a pointer) is any component of GUI (graphical user interface) used for indicating an item for selection from among a plurality items.

SUMMARY

According to an aspect of the invention, there is provided a display-controlling device including: a receiving unit that receives an instruction to select an item from among a plurality of items arranged in a first direction; and a display-controlling unit that controls a display unit to display an image indicating an item selected upon receipt of the instruction at the receiving unit, wherein if a first image indicating a first selected item is displayed at a first position, and an item instructed to be selected changes from the first selected item to a second selected item, the display-controlling unit causes there to be displayed, without erasure of the first image, a second image indicating the second selected item at a second position, which position is reached from the first position by movement in the first direction by an amount based on a position of the second selected item as viewed from the first selected item, with simultaneous movement in a second direction other than the first direction by a predetermined amount.

BRIEF DESCRIPTION OF THE DRAWINGS

An exemplary embodiment of the present invention will now be described in detail based on the following figures, wherein.

DETAILED DESCRIPTION

Exemplary Embodiment

Figure 1:
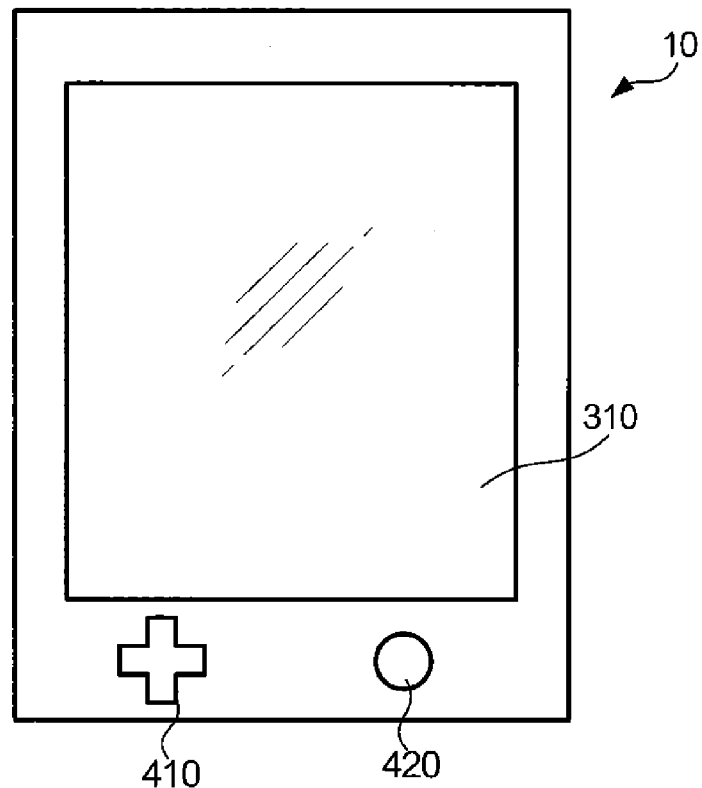
FIG. 1 shows an exterior of a display device.

FIG. 1 shows an exterior of a display device according to an exemplary embodiment of the present invention. As shown in FIG. 1, display device 10 has display surface 310, arrow key 410, and select key 420. Display surface 310 is a component on which an image is displayed. Display surface 310 is included in display unit 300 described later. For convenience of explanation, display surface 310 is described here as having a rectangular shape; however display surface 310 may be of another shape. Arrow key 410 and select key 420 are input units used for an operation (namely, an input operation) by a user. Arrow key 410 and select key 420 are each capable of assuming two states: a state selected by a user; and a state not selected by the user. Arrow key 410 is used to select a direction along the longer side of display surface 310 and a direction along the shorter side of display surface 310. For convenience of explanation, a direction along the longer side is defined hereinafter as an up/down direction, and a direction along the shorter side is defined as a left/right direction. Select key 420 is used when a user wishes to select one item from among plural items, as will be described later.

Figure 2:
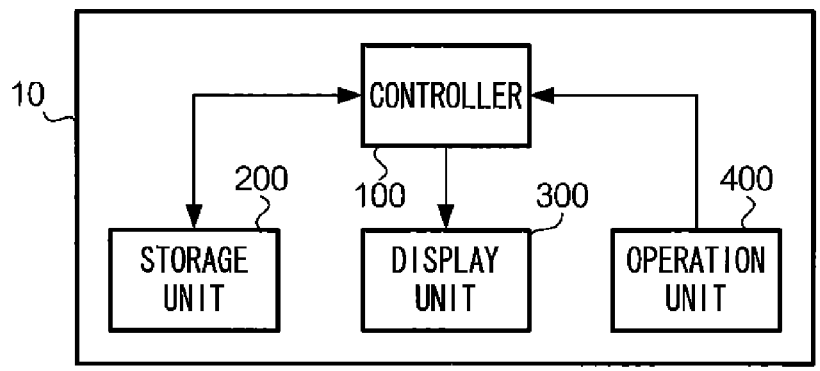
FIG. 2 is a block diagram of a hardware configuration of the display device.

FIG. 2 is a block diagram of a hardware configuration of display device 10. As shown in FIG. 2, display device 10 has controller 100, storage unit 200, display unit 300, and operation unit 400. Display device 10 may include a component in addition to the components shown in FIG. 2, which component is used for transmission and reception of data when the device is connected to a network and/or an external device.

Controller 100 has a processor such as a Central Processing Unit (CPU), and a storage section (namely, a memory) that serves as a primary storage. Controller 100 executes a program to control components of display device 10. In the exemplary embodiment, controller 100 realizes a function of a display-controlling device according to the present invention. Storage unit 200 has a storage section that serves as a secondary storage, and this secondary storage is used for storing data for processing operations carried out by controller 100. In the data stored in storage unit 200, data in which the program is described, and display data representing an image to be displayed (for example, a document or an icon) are included. The storage section of storage unit 200 is, for example, a hard disk or a flash memory. Storage unit 200 may be configured such that the storage section is detachable, in the form of, for example, a memory card. The display data may be hard-coded into a program to be executed by controller 100 if a volume of the data is small. A cursor (to be described later) need not be stored in storage unit 200 in so far as the cursor is a simple figure or symbol only, for example.

Display unit 300 includes a display medium that displays an image using plural pixels while allowing the image to be changed, and a drive circuit to drive the display medium. Display unit 300 displays on display surface 310 an image based on display data. In images to be displayed on display unit 300, at least an image that allows a user to select an item is included. The display medium of display unit 300 may use a liquid crystal element or an electroluminescence element, for example. The display medium according to the exemplary embodiment uses a cholesteric liquid crystal element. Display unit 300 may display a single color or multiple colors. In the exemplary embodiment, the display medium employs a so-called normally white mode, in which a reflectance of the display medium is highest (typically white) when no image is displayed by the display medium. However the principle of the present invention is the same if the display medium employs a normally black mode, in which an image brighter than a background is displayed on the dark background.

In display unit 300 partial driving is employed to redraw a part of an area on display surface 310. The term, "partial driving" as used herein refers to a method of driving a display where a voltage is applied to a part of the display on which it is desired to redraw an image, while a voltage is not supplied to another part of the display. The term "partial driving" refers to a first driving method according to the present invention. Controller 100 employs partial driving when it is not necessary to redraw display surface 310 in its entirety. By employing partial driving power usage can be reduced. In contrast when it is required to redraw screen surface 310 in its entirety, "complete driving" is used. The term "complete driving" is referred to as a second driving method according to the present invention.

In some displays in which partial driving is employed, a change in pixel appearance may temporarily be "irreversible." In this context, "irreversible" refers to a change in pixel appearance that occurs upon employing partial driving, whereupon a reflectance of a display medium changes in one direction only. For example, where a normally white mode is employed in a display medium with irreversible display properties while being capable of partial drawing in a direction in which a reflectance of each pixel decreases (brightness decreases), is not capable of partial drawing in a direction, in which the reflectance increases (brightness increases). To increase reflectance under these conditions it is required to drive the entire display medium, in other words to carry out complete driving. An operation where a display in its entirety is driven and an image displayed upon driving is erased is generally referred to as a refresh operation. On the other hand, partial driving is an operation of drawing additional information without erasure of an existing image.

Upon receipt of an input operation by a user to operation unit 400, information corresponding to the user input (hereinafter, "operation information") is provided to controller 10. Operation unit 400 receives at least an operation via arrow key 410 and select key 420. Operation unit 400 also receives another operation such as power-on/off, as required. Operation unit 400 may have a key or a switch for receipt of another operation. A portion of operation unit 400 particularly to receive an operation via arrow key 410 corresponds to a selecting unit according to the present invention. Operation unit 400 may be provided on display surface 310 provided as a touch screen (touch panel).

Figure 3:
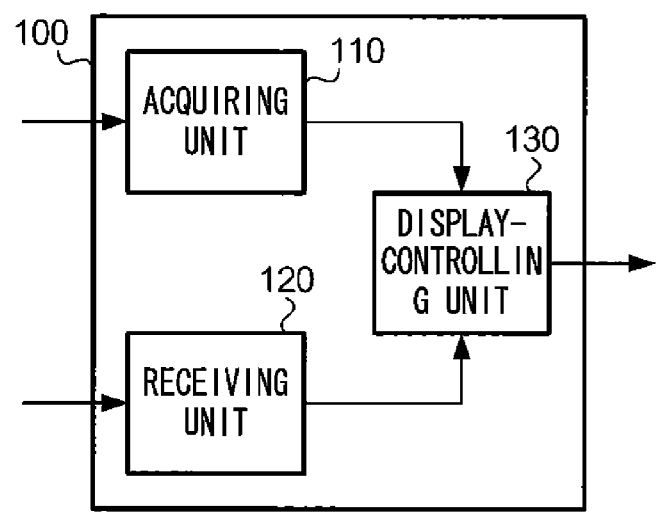
FIG. 3 is a functional block diagram of a functional configuration of a controller.

FIG. 3 is a functional block diagram of a functional configuration of controller 100. Controller 100 realizes a function of acquiring unit 110, receiving unit 120, and display-controlling unit 130 shown in FIG. 3, by executing a program. Acquiring unit 110 acquires display data from storage unit 200 as required. Receiving unit 120 receives an operation by a user on the basis of operation information provided by operation unit 400. In the operation referred here, an operation to select an item described later is included. Display controller 130 controls display of display unit 300 on the basis of an operation received by receiving unit 120 and display data acquired by acquiring unit 110. Display-controlling unit 130 may have a section for recording as a "history" an object displayed prior to redrawing of an image on display unit 300.

The foregoing is a description of the configuration of display device 10. Display device 10 with the above configuration displays an image on the basis of user operation. Display device 10 has a phase for presenting plural items for selection, and a user is prompted to select an item from the plural items (referred to hereinafter as "selecting phase"), as a phase to display an image. The items may be, for example, options or the like, or information in which a subsequent operation of display device 10 is described. Upon selection by a user of an item in the selecting phase, display device 10 redraws an image displayed on display unit 300. In this redrawing phase, display device 10 may employ either partial or complete driving.

Figure 4:
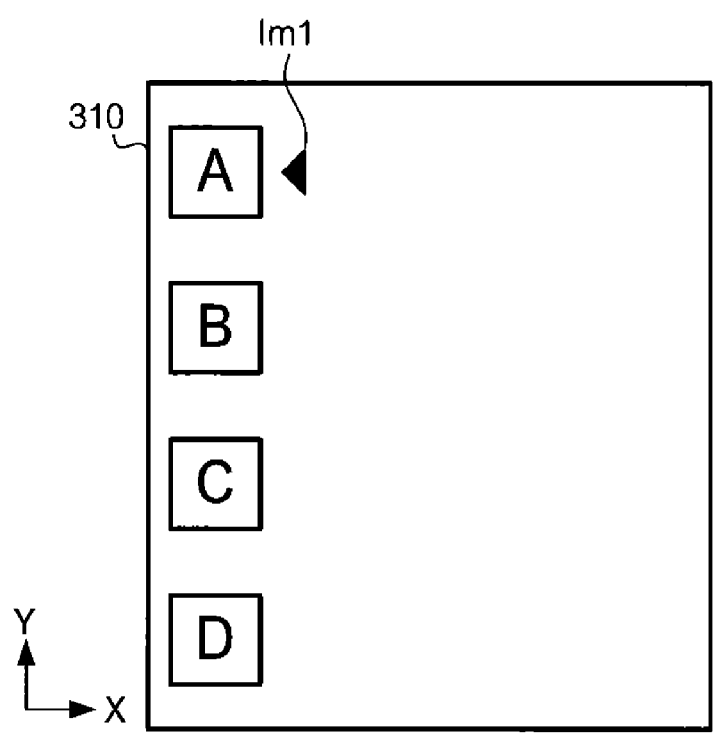
FIG. 4 shows a displayed object on a display unit in a selecting phase.

FIG. 4 shows displayed object on display unit 300 in the selecting phase. In FIG. 4, there are 4 items "A," "B," "C," and "D" to be selected, and the items are aligned along the up/down direction. In the selecting phase, display device 10 display on display unit 300 image 1 ml that indicates (points) either one of the items. An image indicating an item is referred to hereinafter as "cursor." A cursor is displayed on a side (herein right side) of either one of the items during an initial state, namely a state while a user does not perform any operation. An item indicated by the cursor in the initial state may be any item if the item is predetermined. A user causes to move the cursor by operating arrow key 410, and pushes select key 420 when the cursor moves to a side of a desired item.

For convenience of explanation, in the following description, a Cartesian coordinate system is defined such that: the x-axis is along the left/right direction on display surface 310 (a rightward direction is positive); the y-axis is along the up/down direction (an upward direction is positive). A display position of an image is described using this definition. In this Cartesian coordinate system, items A, B, C, and D described above can be considered to be aligned along the y-axis direction. A cursor can be considered to be displayed in the x-axis direction as viewed from each of the items. In this example, the y-axis direction corresponds to a first direction according to the present invention, and the x-axis direction corresponds to a second direction according to the present invention.

Figure 5:
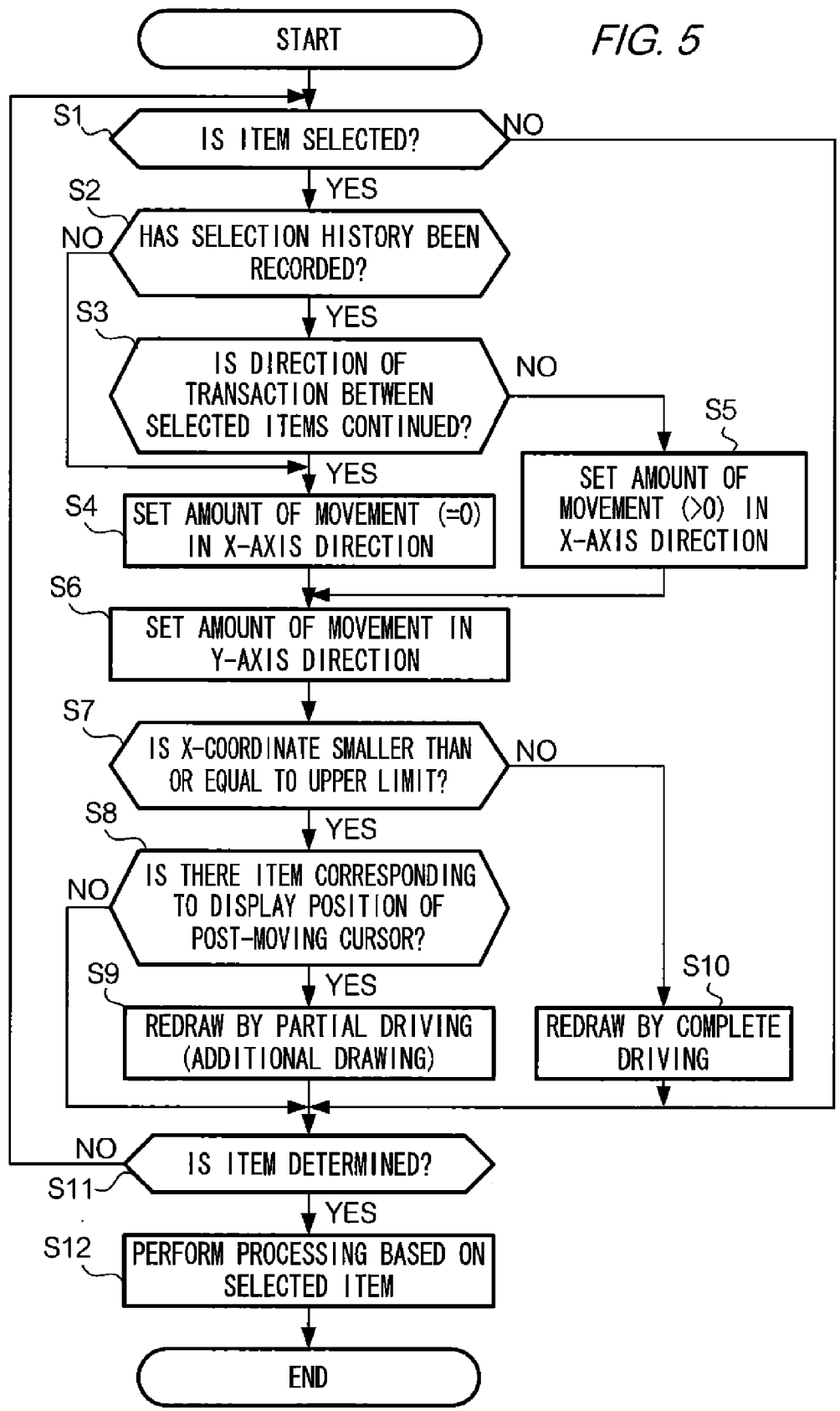
FIG. 5 is a flowchart of a processing performed by the controller in a selecting phase and a subsequent phase.

FIG. 5 is a flowchart of a processing performed by controller 100 in a selecting phase and a subsequent phase in which a processing is performed depending on a result of selection. Controller 100 firstly determines whether the up/down direction is selected via arrow key 410 as shown in FIG. 5 (step S1). This determination is repeated until the up/down direction is selected via arrow key 410, or select key 420 is operated.

If controller 100 receives an operation via arrow key 410 to select the up/down direction, controller 100 then determines whether a selection history has been recorded (step S2). A selection history refers here to a record of items selected by a user in the selecting phase. In the selection history, information of an order in which a user selects items is recorded. In an initial state, namely a state where a user does not perform any operation, no selection history exists.

If the selection history has been recorded, controller 100 determines a direction of a transaction between items selected by a user, and further determines whether the transaction continues in a positive direction or a negative direction (step S3). A user selects items in either a positive direction or a negative direction of the y-axis. For example, if a user selects item C after item B, a direction of a transaction between the items is the negative direction. If a user selects item A after item B, a direction of a transaction between the items is the positive direction. Further, if a user makes a selection three times in order of item A, item B, and item C, a transaction between the selected items continues in the negative direction. If a user makes a selection three times in order of item C, item B, and item A, a transaction between the selected items continues in the positive direction. However, if a user makes a selection three times in order of item B, item A, and item B, a transaction between the selected items does not continue in the same direction because a direction of the transaction changes from the positive direction to the negative direction.

Controller 100 sets an amount of movement of the cursor in the x-axis direction based on the determination of Step S3. Specifically, if a transaction between items selected by a user continues in neither the positive direction nor the negative direction of the x-axis, controller 100 sets an amount of movement in the x-axis direction to a predetermined value (however a positive value other that the value of "0") (step S5). Meanwhile, if a transaction between items selected by a user continues in the positive direction or negative direction of the y-axis, controller 100 sets an amount of movement in the x-axis direction to the value of "0" (step S4). In other words, if a transaction between items selected by a user continues in the positive direction or the negative direction of the y-axis, controller 100 prevents a cursor from moving in the x-axis direction. Controller 100 also sets an amount of movement in the x-axis direction to the value of "0" if a selection history has not been recorded, in other words a case where a transaction between selected items cannot be determined.

After setting an amount of movement of the cursor in the x-axis direction, controller 100 sets an amount of movement of the cursor in the y-axis direction (step S6). The amount of movement in the y-axis direction has a determined value depending on a space between an item indicated by a pre-moving cursor and an item indicated by a post-moving cursor. Controller 100 sets an amount of movement of a cursor in the y-axis direction such that the cursor is displayed on the side of the selected item.

Controller 100 then determines by calculating a position where is reached from a display position of the pre-moving cursor by a movement by the amount of movement determined at step S4, S5, and S6, and determines whether an x-coordinate of the determined position is smaller than or equal to a predetermined upper limit (step S7). A display position of a cursor is set within a predetermined range (referred to hereinafter as "display range") of display surface 310. Controller 100 determines in step S7 whether the cursor is displayed within the display range after the cursor is moved.

If the x-coordinate of the display position of the post-moving cursor is smaller than or equal to the upper limit, controller 100 determines whether an item corresponding to the display position of the post-moving cursor exists (step S8). For example, in FIG. 4 there are no selectable items at the upper part of item A. In a situation where item A is selected, if the cursor is further moved in the upward direction, since there are no selectable items, the operation is not valid. In this case, controller 100 deems an operation by a user to be invalid, and prevents the cursor from moving in both the y-axis direction and the y-axis direction. In other word, the determination of step S7 can be considered to be used for determining whether a display position of a cursor is within a display range in the x-axis direction. The determination of step S8 can be considered to be used for determining whether a display position of a cursor is within a display range in the y-axis direction.

If the display position of the cursor is within the display range in both the x-axis direction and the y-axis direction, controller 100 causes display unit 300 to redraw by partial driving (namely, an additional drawing) to display the cursor at a new display position (step S9). In this step, the cursor is moved on the basis of the amount of movement determined in each of step S4, S5, and S6. Meanwhile, if the display position of the cursor is outside the display range in the x-axis direction, controller 100 causes display unit 300 to redraw by complete driving to display the cursor at a new display position (step S10). In this step, the cursor is moved in the y-axis direction on the basis of the amount of movement determined at step S6; while the cursor is simultaneously moved in the x-axis direction on the basis of an x-coordinate of an initial position, regardless of an amount of movement determined in each of step S4, S5, and S6.

After displaying the new cursor, controller 100 determines whether select key 420 is operated (step S11), if select key 420 has no operation, controller 100 repeats subsequent processing at step S1. Meanwhile, if select key 420 is operated by a user, controller 100 ends the selecting phase, and moves to the subsequent phase, in which a processing is performed depending on a result at selection (step S12). In the subsequent phase, controller 100 performs a processing on the basis of an item corresponding to a display position of a cursor displayed most recently (namely, an item currently selected), and then ends the present processing.

Figure 6:
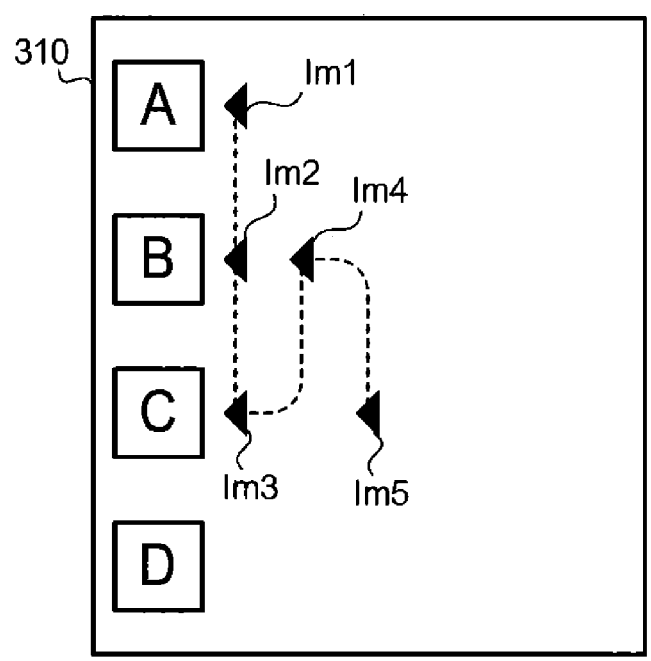
FIG. 6 shows a displayed object on the display unit.
Figure 7B:
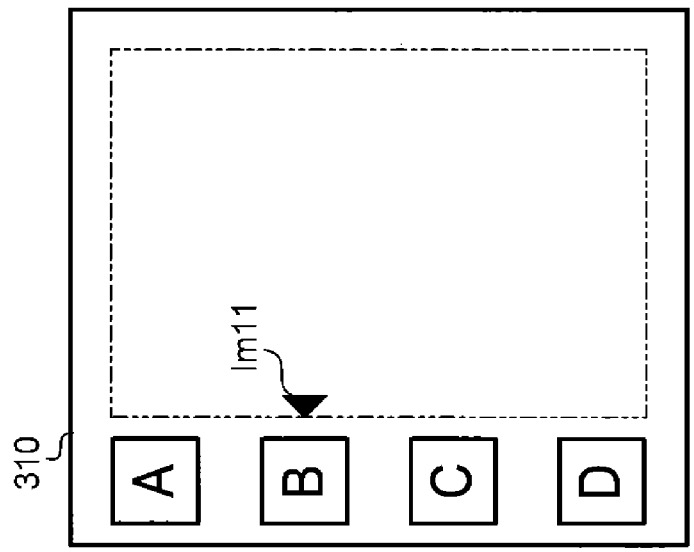
FIGS. 7A and 7B show displayed objects on the display unit.
Figure 7A:
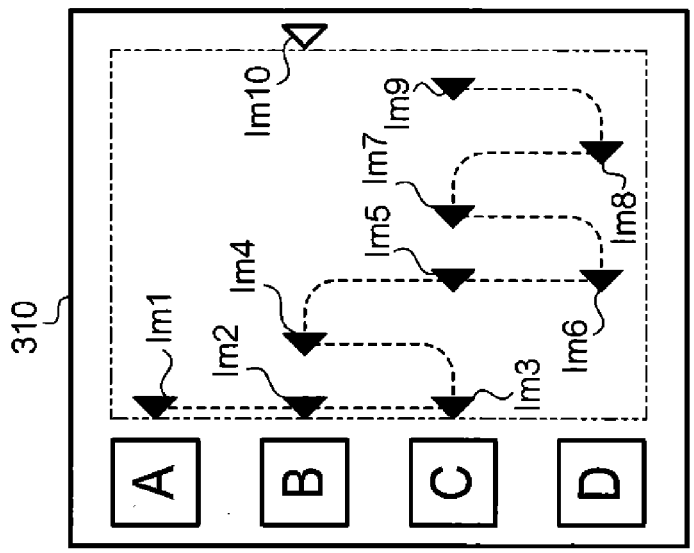

FIGS. 6, 7A, and 7B show displayed object on display unit 300 when the processing shown in FIG. 5 is performed. In FIG. 6, images Im1, Im2, Im3, Im4, and Im5 respectively represent cursors. Image 1 m1 corresponds to a cursor displayed in an initial state. Dotted lines shown in FIG. 6 is an image indicating a transition between items selected using a cursor; however the dotted lines is an example only. The image indicating the transaction may be a solid line or an arrow, alternatively the image may not be displayed. The image indicating the transition may be a straight line or a curve. Further the image indicating the transition may not contact images representing continuing two cursors if it is displayed between these images. These images are displayed by a partial driving.

FIG. 6 shows displayed object when item A is selected in an initial state, and then a user selects items in order of item B, item C, item B, and item C. When displaying image Im2, since there is no selection history, controller 100 sets an amount of movement in the x-axis direction to the value of "0" as viewed in a display position of image Im1. This operation corresponds to a pattern in which the determination at step S2 is "NO." When displaying image Im3, since a transaction between the items selected by a user continues in the negative direction, controller 100 sets an amount at movement in the x-axis direction to the value at "0" as viewed in a display position at image Im2. This operation corresponds to a pattern in which the determination of step S3 is "YES." However, when displaying images Im4 and Im5, controller 100 sets an amount of movement in the x-axis direction to a predetermined value other than "0." This operation corresponds to a pattern in which the determination of step S3 is "NO." In this case, a cursor that is displayed at the rightmost position on display surface 310 and has a maximum value of an x-coordinate corresponds to an item selected at that time. If plural cursors having an identical maximum x-coordinate are displayed, a cursor displayed most recently of the cursors corresponds to an item selected at that time.

FIGS. 7A and 7B show objects displayed when display unit 300 redraws by complete driving. A long- and double short-dashed line of each of FIGS. 7A and 7B indicates a range in which a cursor is displayed. In other words, controller 100 controls display of a cursor such that the cursor is within the range indicated by the line. It is assumed that in FIGS. 7A and 7B item A is selected in an initial state.

In FIG. 7A, image Im9 is a cursor displayed most recently. Accordingly, an item selected by a user at this time is item C. In this case, if a user selects an upward direction using arrow key 410 to select item B next, controller 100 calculates a position indicated by image Im10 as a display position of a next cursor. However, the position of image Im10 is outside the range in which display of a cursor is allowed (a range indicated by the line). In this case, controller 100 erases all cursors that have been displayed, and newly displays image Im11. In other words, controller 100 additionally draws without erasing cursors until a display position of a next cursor is outside the predetermined range.

As described above, display device 10 moves a display position of an image serving as a cursor in a positive direction of the x-axis when a condition is satisfied, thereby if selection of an item is repeated several times, overlap of images serving as cursors is prevented. In addition, when both partial and complete driving are employed in display device 10, a number of redrawings carried out by complete driving is decreased, as compared with a case where partial driving is not employed. Further, a great number of images indicating selected items are displayed before complete driving is performed. This is contrary to a case where a determination at step S3 is "NO," and processing at step S4 (processing to set an amount of movement in the x-axis direction to the value of "0") is performed, and then the processing at step S5 (a processing to set a amount of movement in the x-axis direction to a value other than "0") is performed.

Modifications

The present invention is not limited to the exemplary embodiment described above. The present invention can be practiced as modifications described below. In addition, these modifications may be combined with each other.

Modification 1

A first direction and a second direction according to the present invention are not limited to directions shown in FIG. 4. For example, the first direction and the second direction according to the present invention may be directions reversed positive to negative from the x-axis direction and the y-axis direction shown in FIG. 4. Alternatively, the x-axis direction may be the second direction and the y-axis direction may be the first direction. The first direction and the second direction according to the present invention need not have an orthogonal relationship with each other.

Figure 8:
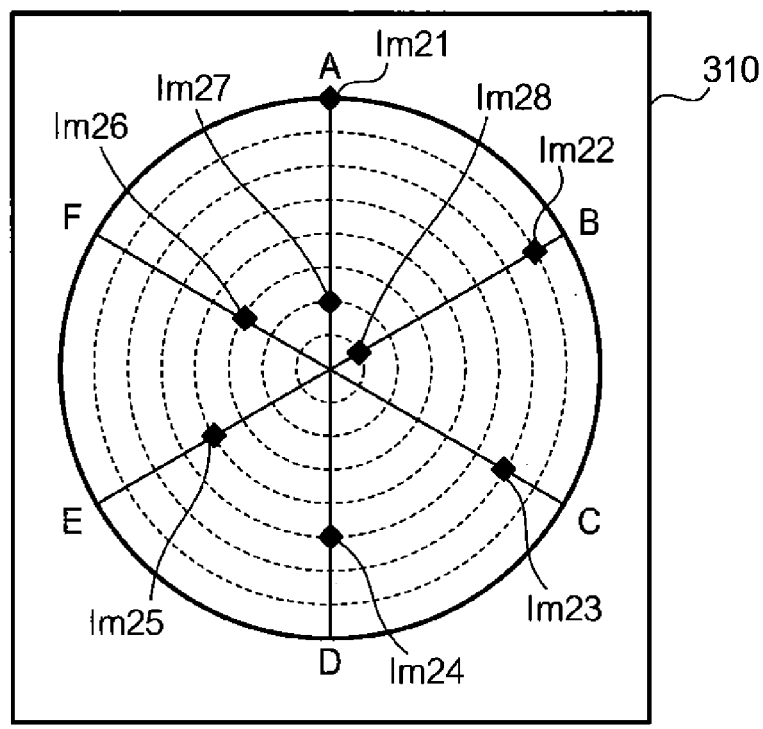
FIG. 8 shows a displayed object on the display unit.

FIG. 8 shows a first direction and a second direction indicated by using a polar coordinate system (a circular polar coordinate). In FIG. 8, items A, B, C, D, E, and F are arranged in a circumferential direction. Further, adjacent items are arranged such that the items are spaced apart by 60 degrees. If a circular polar coordinate system is defined such that the center of a circle is a singular point (an origin), an amount of movement in the first direction is indicated by a declination θ, and an amount of movement in the second direction is indicated by a radius vector r. It is to be noted that an initial line may be located at any position.

FIG. 8 shows cursors Im21, Im22, Im23, Im24, Im25, Im26, Im27, and Im28 displayed when items are selected in order of item A, item B, item C, item D, item E, item F, item A, and item B. In FIG. 8, a display position of a cursor moves closer to the center of a circle, as a number of the selection increases. The cursor may move by an amount of movement having a constant value each time, or may move by an amount of movement having a different value (for example, an amount of movement decreases, as a cursor is closer to the center of a circle). In contrast to the case described, a display position of a cursor may move further from the center of the circle as a number of selections increases.

Modification 2

Figure 9:
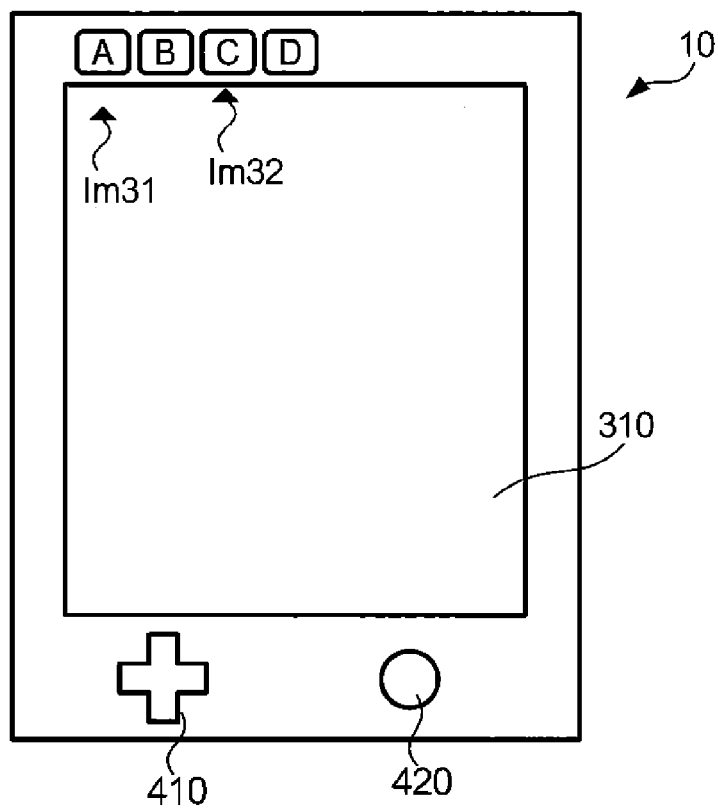
FIG. 9 shows a displayed object on the display unit.

In this invention, items to be selected need not be displayed on a display surface. FIG. 9 shows an object to be selected other than images displayed on a display surface. In FIG. 9, items A, B, C, and D may be images printed on display device 10 in advance, or may be keys that receive an operation by a user. In the former example, a user changes a position of a cursor by selecting the left/right direction using arrow key 410. In the latter example, cursors Im31 and Im32 serving as images to indicate information that represents keys operated by a user and an order in which the user operates the keys. In this case, controller 100 may control a display position of a cursor on the basis of an instruction inputted using the keys, instead of an instruction inputted via key 410.

Modification 3

Figure 10A:
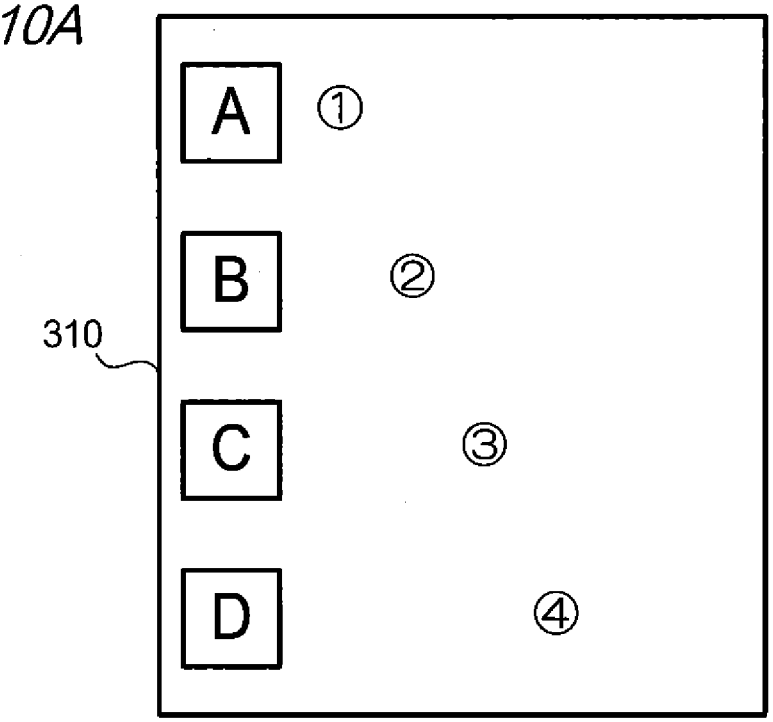
FIGS. 10A and 10B show displayed objects on the display unit.
Figure 10B:
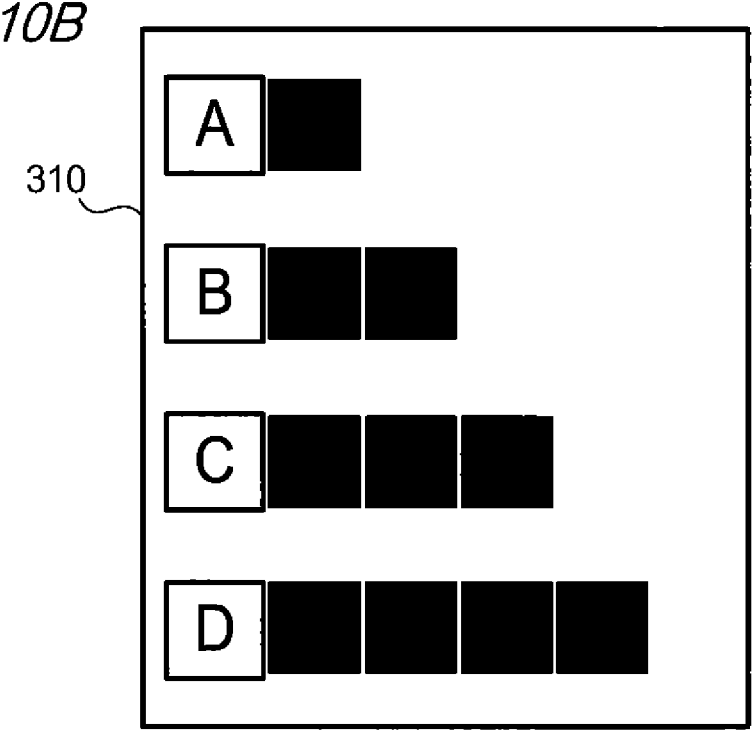

In the present invention, images indicating selected items may be different images, or may be displayed together with additional images. FIGS. 10A and 10B show images indicating selected items in this modification. In FIG. 10A, orders of selection are displayed as images indicating selected items. In FIG. 10B, images serving as a cursor are displayed such that the images extend in the x-axis direction. In FIG. 10B a new cursor is displayed such that the cursor is connected to a cursor displayed before. FIGS. 10A and 10B show images displayed when items are selected in an order of item A, B, C, and D.

In FIG. 10B, images serving as cursors are displayed such as to extend regardless of a direction of a transaction between selected items. Therefore in this modification, the determinations at step S2 and S3 may be omitted, and the processing of FIG. 5 is performed regardless of the determinations.

Modification 4

The present invention can be practiced as a display-controlling device for controlling display of a display device or program, other than the described. The display-controlling device according to the present invention may be integrated in a display device, or may be provided as separate device from the display device. A program according to the present invention may be provided while being stored in a recording medium such as an optical disk, or downloaded to a computer via a network such as the Internet, and installed in the computer and used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments have been chosen and described so that the principles of the invention and its practical applications are best explained, thereby enabling others skilled in the art to understand the invention for use with various embodiments and with various modifications as suited to a particular use contemplated. It is intended that the scope of the invention be defined by the following claims and their equivalents.

What is claimed is:

1. A display-controlling device comprising:
   a. a receiving unit that receives an instruction to select an item from among a plurality of items arranged in a first direction; and
   b. a display-controlling unit that controls a display unit to display an image indicating an item selected upon receipt of the instruction at the receiving unit, wherein
   c. a first instance of the image comprises a first cursor and a second instance of the image comprises a second cursor, wherein
   d. if the first cursor indicating a first selected item is displayed at a first position, and an item instructed to be selected changes from the first selected item to a second selected item in the first direction, the display-controlling unit causes there to be displayed the second cursor indicating the second selected item at a second position, which position is reached from the first position by movement in the first direction by an amount based on a position of the second selected item as viewed from the first selected item, and e. an item instructed to be selected changes from the second selected item to a third selected item in a second direction opposite to the first direction, the display controlling unit causes there to be displayed a third instance of the image comprising a third cursor indicating the third selected item at a third position, which position is reached from the second position by movement in the second direction by an amount based on a position of the third selected item as viewed from the second selected item with simultaneous movement in a third direction other than the first direction and the second direction by a predetermined amount, while the first cursor continues to be displayed at the first position and the second cursor continues to be displayed at the second position without being erased.

2. The display-controlling device according to claim 1, wherein:
if a transaction between items selected upon receipt of the instruction at the receiving unit continues in a direction that is opposite to a direction previously moved, the display controlling unit effects the movement in the second direction; and
if the transaction continues in either the positive direction or the negative direction of the first direction, the display controlling unit does not affect the movement in the second direction.

3. The display-controlling device according to claim 2, wherein:
the display unit has a display medium to display a plurality of images in a predetermined area, and drives the display medium by a first driving method, in which an image is displayed by additionally drawing, or a second driving method, in which an image is displayed by redrawing an area in its entirety;
if the second position is within the area, the display-controlling unit drives the display unit by the first driving method; and
if the second position is outside the area, the display-controlling unit drives the display unit by the second driving method.

4. The display-controlling device according to claim 2, wherein when the second cursor is displayed, the display-controlling unit causes there to be displayed an image representing a transition between the selected items at a position between the first cursor and the second cursor.

5. The display-controlling device according to claim 1, wherein:
the display unit has a display medium to display a plurality of images in a predetermined area, and drives the display medium by a first driving method, in which an image is displayed by additional drawing, or a second driving method, in which an image is displayed by redrawing an area in its entirety;
if the second position is within the area, the display-controlling unit drives the display unit by the first driving method; and
if the second position is outside the area, the display-controlling unit drives the display unit by the second driving method.

6. The display-controlling device according to claim 5, wherein when the second cursor is displayed, the display-controlling unit causes there to be displayed an image representing a transition between the selected items at a position between the first cursor and the second cursor.

7. The display-controlling device according to claim 1, wherein when the second cursor is displayed, the display-controlling unit causes there to be displayed an image representing a transition between the selected items at a position between the first cursor and the second cursor.

8. A display device comprising:
a. a selecting unit that selects either one of a plurality of items arranged in a first direction;
b. a display unit that displays an image indicating an item selected by the selecting unit; and
c. a display-controlling unit that controls a display position of the image displayed on the display unit, wherein
d. wherein a first instance of the image is a first cursor and a second instance of the image is a second cursor, wherein
e. if the first cursor indicating a first selected item is displayed at a first position, and an item selected by the selecting unit is changed from the first selected item to a second selected item in the first direction, the display-controlling unit causes there to be displayed the second cursor indicating the second selected item at a second position, which position is reached from the first position by movement in the first direction by an amount based on a position of the second selected item as viewed from the first selected item, and
f. an item instructed to be selected changes from the second selected item to a third selected item in a second direction opposite to the first direction, the display controlling unit causes there to be displayed a third instance of the image comprising a third cursor indicating the third selected item at a third position, which position is reached from the second position by movement in the second direction by an amount based on a position of the third selected item as viewed from the second selected item with simultaneous movement in a third direction other than the first direction and the second direction by a predetermined amount, while the first cursor continues to be displayed at the first position and the second cursor continues to be displayed at the second position without being erased.

9. A display-controlling method comprising:
a. receiving an instruction to select an item from among a plurality of items arranged in a first direction; and
b. controlling a display unit to display an image indicating an item selected upon receipt of the instruction, wherein
c. wherein a first instance of the image is a first cursor and a second instance of the image is a second cursor, wherein
d. if the first cursor indicating a first selected item is displayed at a first position, and an item instructed to be selected changes from the first selected item in the first direction to a second selected item, the second cursor indicating the second selected item is displayed at a second position, which position is reached from the first position by movement in the first direction by an amount based on a position of the second selected item as viewed from the first selected item, and
e. an item instructed to be selected changes from the second selected item to a third selected item in a second direction opposite to the first direction, the display controlling unit causes there to be displayed a third instance of the image comprising a third cursor indicating the third selected item at a third position, which position is reached from the second position by movement in the second direction by an amount based on a position of the third selected item as viewed from the second selected item with simultaneous movement in a third direction other than the first direction and the second direction by a predetermined amount, while the first cursor continues to be displayed at the first position and the second cursor continues to be displayed at the second position without being erased.

10. A non-transitory computer readable medium storing a program causing a computer to execute a process for display controlling, the process comprising:
   a. receiving an instruction to select an item from among a plurality of items arranged in a first direction; and
   b. controlling a display unit to display an image indicating an item selected upon receipt of the instruction, wherein
   c. wherein a first instance of the image is a first cursor and a second instance of the image is a second cursor, wherein
   d. if the first cursor indicating a first selected item is displayed at a first position, and an item instructed to be selected changes from the first selected item to a second selected item in the first direction, the second cursor indicating the second selected item is displayed at a second position, which position is reached from the first position by movement in the first direction by an amount based on a position of the second selected item as viewed from the first selected item, and
   e. an item instructed to be selected changes from the second selected item to a third selected item in a second direction opposite to the first direction, the display controlling unit causes there to be displayed a third instance of the image comprising a third cursor indicating the third selected item at a third position, which position is reached from the second position by movement in the second direction by an amount based on a position of the third selected item as viewed from the second selected item with simultaneous movement in a third direction other than the first direction and the second direction by a predetermined amount, while the first cursor continues to be displayed at the first position and the second cursor continues to be displayed at the second position without being erased.

* * * * *